United States Patent [19]

Chang et al.

[11] Patent Number: 4,589,526

[45] Date of Patent: May 20, 1986

[54] CONTROLLABLE FLUID DAMPER FOR FLUID-CONTAINING TANK

[75] Inventors: Yi M. Chang, Woodland Hills; James R. Fenwick, Chatsworth, both of Calif.

[73] Assignee: Rockwell International Corporation, El Segundo, Calif.

[21] Appl. No.: 619,081

[22] Filed: Jun. 11, 1984

[51] Int. Cl.$^4$ ............................................. F16D 49/00
[52] U.S. Cl. ..................................... 188/74; 188/271; 188/290; 220/22; 220/22.2; 210/368
[58] Field of Search ................... 188/74, 271, 290; 210/368, 367; 220/22, 22.1, 22.2

[56] References Cited

U.S. PATENT DOCUMENTS

| 650,402 | 5/1900 | Laplace | 210/368 X |
| 813,282 | 2/1906 | Dutcher | 210/368 X |
| 3,086,620 | 4/1963 | Elfes | 188/74 X |
| 3,630,331 | 12/1971 | Bradbury | 192/58 R |
| 3,979,005 | 9/1976 | Robinson et al. | 220/22 X |
| 4,265,386 | 5/1981 | Levy et al. | 226/190 |
| 4,437,551 | 3/1984 | Gimmler et al. | 192/3.28 |

FOREIGN PATENT DOCUMENTS

| 491489 | 6/1928 | Fed. Rep. of Germany | 210/368 |
| 1506046 | 6/1969 | Fed. Rep. of Germany | 220/22 |
| 632618 | 10/1927 | France | 210/368 |
| 1268538 | 6/1961 | France | 220/22 |
| 1026132 | 4/1966 | United Kingdom | 188/74 |

Primary Examiner—George E. A. Halvosa
Attorney, Agent, or Firm—H. Fredrick Hamann; Harry B. Field; Clark E. DeLarvin

[57] ABSTRACT

A controllable fluid damper 14 for a fluid-containing tank 10 in a space vehicle comprising a hollow sphere 14. The wall of the sphere 14 is a honeycomb structure of six-sided cells 24 arranged with respect to the sphere 14 so that the open ends of the cells 24 lie along the radii of the sphere 14. The flat sides of the cells 24 contain small holes 26 which present some resistance to the flow of fluid therethrough. The outer surface of the sphere 14 lies adjacent the inner surface of the tank wall 12. A number of spaced brake pads are located in the tank wall 12 so that the surfaces of the pads are co-planar with the inner surface of the tank wall 12. One of the brake pads, 16, is radially movable in the inward direction; the remainder, 18, are fixed in position. The sphere 10 can rotate with the fluid when a maneuver of the vehicle is started and, then, rotation of the damper 14 can be arrested by moving the movable brake pad 16 into pressure contact with the outer surface of the damper 14. The pressure also forces the surface of the damper 14 into contact with the fixed brake pads 18.

5 Claims, 4 Drawing Figures

CONTROLLABLE FLUID DAMPER FOR FLUID-CONTAINING TANK

STATEMENT OF GOVERNMENT INTEREST

The Government has rights in this invention pursuant to Contract (or Grant) No. F04704-77-C-0028 awarded to the U.S. Department of the Air Force.

BACKGROUND OF THE INVENTION

1. Field of the Invention

This invention relates to apparatus for controlling the movement of a fluid relative to a container body in which it is stored and especially to a controllable fluid damper for a fluid-containing tank of a space satellite.

2. Description of the Prior Art

Positive-expulsion fuel and oxidizer tanks such as those used in space satellites, for example, have such severe design and operational problems that the current trend is toward use of free surface tanks. Free surface tanks, however, have two very significant problems. The first is one of pressurization gas flow into the propellant feed line. This problem can apparently be controlled by the use of a propellant acquisition system using surface tension screens. The second and potentially more serious problem, involves loss of control of the liquid bulk, and interaction of the fluid, structure and stage control system.

During a stage maneuver in space the fluid is set into motion by pressure forces normal to the tank surface and also by viscous shear forces due to relative motion between the fluid and tank wall. After the stage maneuver the fluid remains in motion until its motion relative to the tank wall can be damped. The fluid motion is primarily rotation, flowing around the inner surface, circulating through screens and floating across the tank. With no damping, forces are still applied to the tank due to the curved paths of the fluid. In addition, viscous forces due to relative motion between the fluid and tank act on the tank as well as the fluid. The net effect of the torques and forces on the stage orientation must be counteracted by torques commanded by the control system.

Designs using conventional baffles increase the coupling between the fluid and tank so that the rate of decay of the fluid momentum is increased. During the transient maneuver, however, the coupling is also increased so that more fluid is involved in the stage motion. Just after the maneuver then, the residual torques of the fluid on the tank will be higher with the baffled tank than tank without baffles. Due to the difference in decay rate, there will be a time where torques for both types of tank are about equal. For greater time, the baffled tank will show lower torques.

OBJECTS OF THE INVENTION

An object of the present invention is to allow free rotation of the fluid in a tank during an initial movement of the tank and yet to damp the fluid movement quickly when the tank movement has ceased.

Another object is to provide an internal tank damper which is free to rotate within the tank but the position of which relative to the tank can be fixed when desired.

Other objects, advantages and novel features of the present invention will become apparent from the following detailed description of the invention when considered in conjunction with the accompanying drawing.

SUMMARY OF THE INVENTION

The present invention is a controllable fluid damper for damping relative rotational movement of a fluid within a holding vessel. The invention preferably comprises a sphere formed from cells, which are preferably hexagonal, placed within a fluid-containing tank. The cells are aligned to present their open basal sides along the radii of the sphere and are also formed with holes in their radially extending sides, thereby permitting the fluid in the tank to move through the sphere. The sphere could also be formed from a solid material with a plurality of holes drilled therethrough in both radial and non-radial directions to provide a structure similar to that of the sphere formed from hexagonal cells, as previously described.

The outer surface of the damper sphere is adjacent to the inner circular surface of the tank at some areas, since the tanks are either spherical or cylindrical in shape. Brake pads, one movable and at least one fixed, are located in the tank wall so that the surfaces of the fixed pads are coplanar with the inside surface of the tank wall. The damper sphere is thus free to rotate. One of the brake pads, however, can be depressed so that it presses against the sphere. The sphere then is pressed into contact with the three brake pads which quickly stop its rotation.

Stoppage of the rotation of the sphere quickly damps the rotation of the fluid inside the tank. Thus, this type of fluid damper can provide the optimum performance during the transient, affording a period of minimum rotational momentum during the motion of the tank and maximum decay rate for the fluid motion when the tank movement stops.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
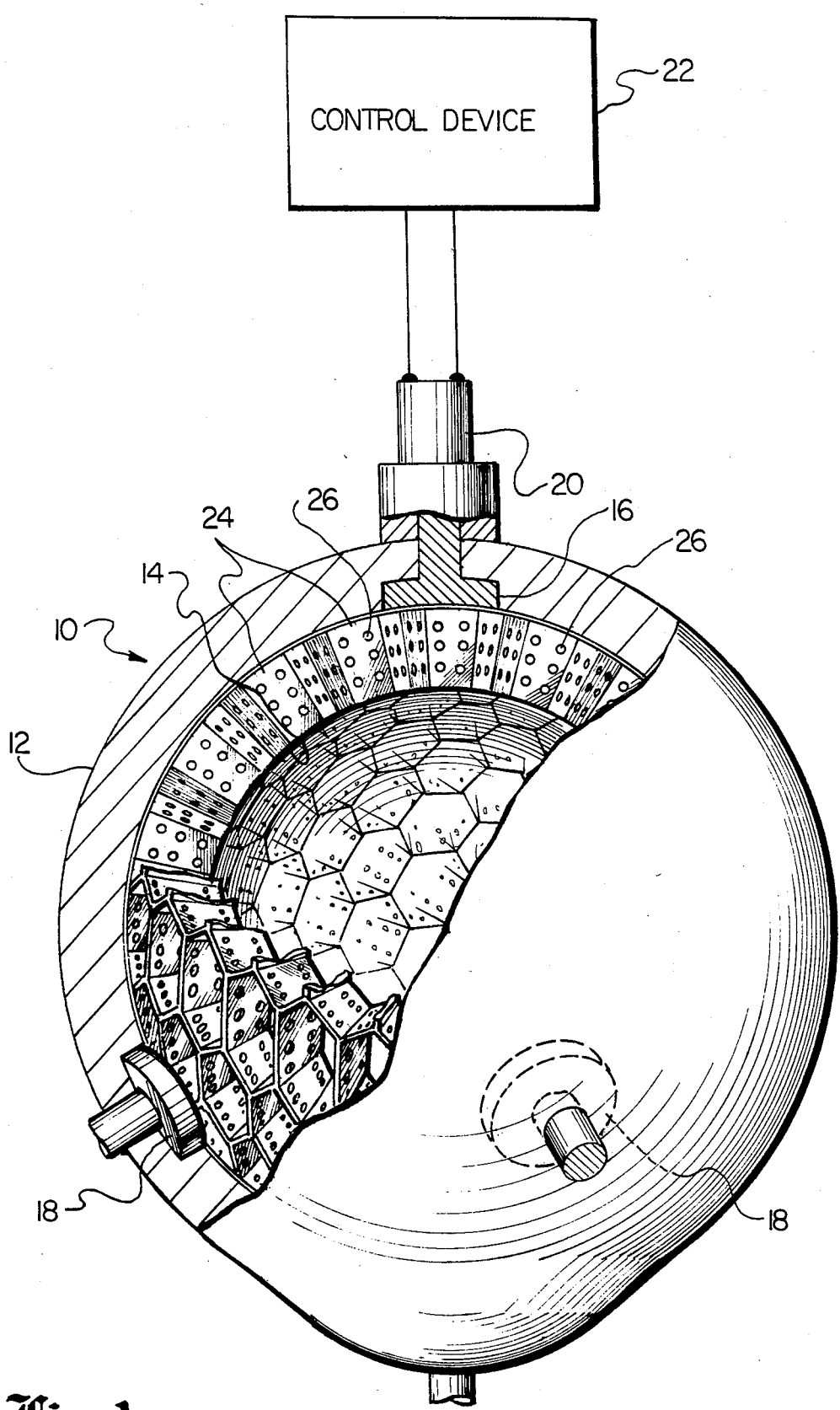
FIG. 1 is a partially broken away, schematic illustration of an embodiment of the invention.

The invention is illustrated in FIG. 1 in a fluid-containing tank 10. The wall 12 of the tank 10 is substantially spherical in shape. A damper, or baffle, 14 in the shape of a hollow sphere is located inside and adjacent to the inside surface of the wall 12 of the tank 10, and is free to rotate in any direction.

A plurality of brake pads 16 and 18 are located at different positions in recesses in the tank wall 12 so that the lower curved surfaces of the pads are aligned (i.e., coplanar or coextensive) with the curved inner surface of the wall 12. All brake pads 18 are fixed in place except for one, 16, which can be moved radially inward to make pressure contact with the outer surface of the damper 14.

Various means may be employed to power the movable pad 16. For example, a piezoelectric motor 20 comprising a set of stacked piezoelectric wafers may be energized by a control device 22 through which an activating voltage may be applied to the motor 20, as desired. Other actuating devices may be of the hydraulic or pneumatic types.

Figure 2:
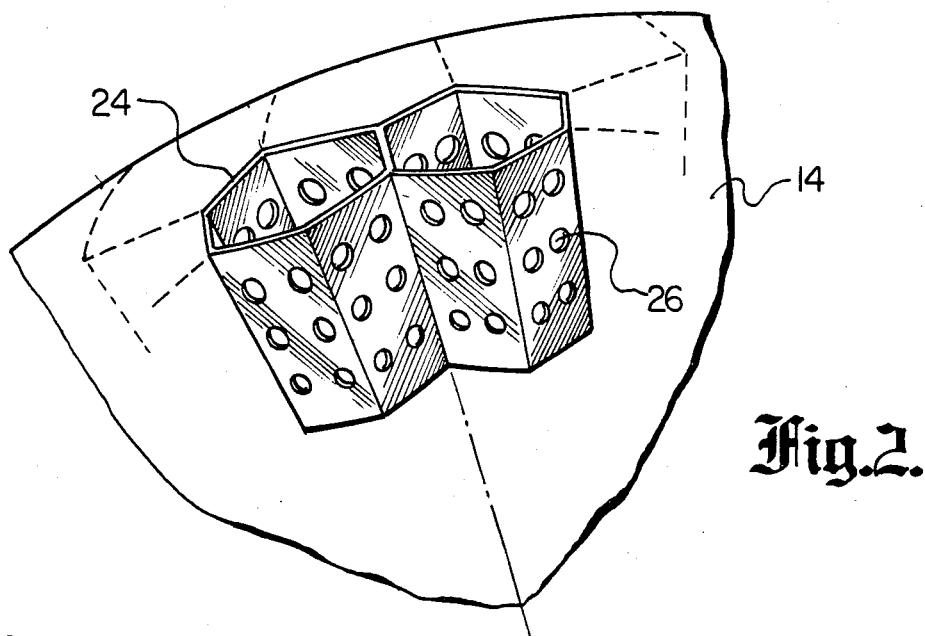
FIG. 2 is a schematic illustration of the honeycomb cells which form the damper sphere used in the invention.

The spherical damper 14 preferably comprises a plurality of six-sided cells affixed to each other in a honeycomb structure. Two of these cells 24 are shown in FIG. 2. The cells 24 are arranged with their longitudinal axes in line with the radii of the damper sphere and the inner and outer radial ends (bases) of each cell 24 are open. The open ends and the holes allow the fluid in the tank 14 to pass through the damper 14, although the holes 26 present a resistance to the flow.

The hexagonal cells and the brake pads may be made of materials which are chemically inert to the fluid in the tank; for example, the damper cells may be made of Ti or Al, and the brake pads of asbestos.

In operation, assuming the tank 10 is located in a space satellite, for example, at the start of a satellite maneuver, the damper 14 will not resist the motion of the fluid in the tank 10 but will rotate with it. However, when the maneuver ceases, the control device 22 is activated and a signal is applied to the motor 20 of the movable brake pad 16. The motor 20 moves the pad 16 into contact with the outer surface of the damper 14, pushing other areas of the outer surface of the damper 14 into contact with the fixed brake pads 18 and stopping the rotation of the damper sphere. The resistance of the damper 14 to the flow of the fluid passing through the holes 26 in the damper 14 quickly stops the rotational motion of the fluid.

It should be noted that only one fixed brake pad 18 is required if the fixed pad 18 is directly opposite the movable pad 16. In general, however, it is preferable to use two or three fixed pads spaced equidistantly from each other and located in the opposite hemisphere from that in which the movable pad 16 is located. Location of the pads is a matter well within the capabilities of any mechanical engineer and thus will not be further discussed.

Figure 3:
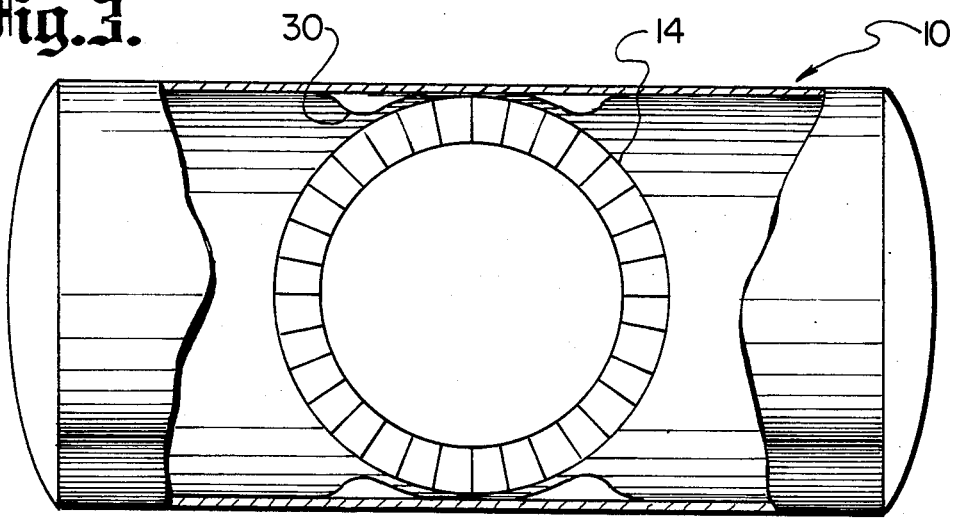
FIG. 3 is a schematic illustration of the position of the damper sphere in a cylindrical tank.

FIG. 3 indicates how a spherical fluid damper 14 could be placed inside a cylindrical tank 10. To keep the damper 14 from rolling back and forth inside the cylinder, arcuate stops 30 are placed on the inside surface of the tank wall in positions which keep the damper 14 in its desired position.

Figure 4:
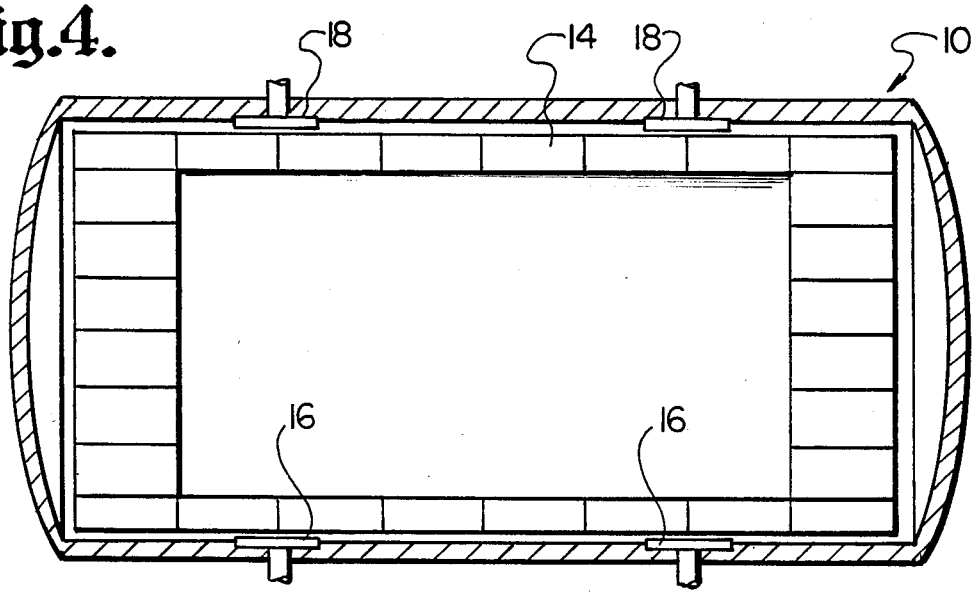
FIG. 4 is a cross-sectional schematic illustration of a damper in the shape of a cylinder.

Although the fluid damper has been heretofore described as spherical in shape, it may also be cylindrical in shape. Such a cylindrically-shaped damper 14 is shown in FIG. 4 inside a cylindrical fluid container 10. In this dase, the damper 14 rotates only in the roll direction with respect to the longitudinal axis of the tank 10, that is to say, transversely to the longitudinal axis of the cylindrical section of the tank. This is useful in stopping rolling rotation of the fluid where the tank 10 is stored aboard a ship, for example. Two movable brake pads 18 may be installed on one side of the tank 10 and two fixed brake pads may be installed diametrically opposite the movable pads.

Again, the wall of the hollow body of the fluid damper 14 is preferably formed from a honeycomb structure of hexagonal cells whose open basal ends face in the direction of the curved ends of the cylindrical tank 10, that is, a line or axis through the center of the basal ends of any cell would lie parallel to the longitudinal axis of the cylindrical section of the tank 10. The sides of the cells are affixed to each other and have holes drilled therethrough. The material forming the basal ends of the cells is also bonded together wherever the cells extend in the longitudinal direction.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A controllable fluid damper for a fluid-containing spherical tank having a circular section of wall therein comprising:
    a hollow sphere having a wall an outer surface of which lies adjacent to an inner surface of the circular section of the tank wall,
    the wall of the sphere being formed with holes therethrough both radially and in non-radial directions for imparting a dampening effect on fluids passing therethrough;
    said sphere being free to rotate in any direction within said spherical tank in response to rotational fluid motion within said tank; and
    braking means, separate and apart from any braking forces imposed on said sphere by said fluid, for halting the rotational motion of said sphere and dampening rotational motion of said fluid when such is desired.

2. A damper as in claim 1, wherein:
    the wall of said sphere is formed from a plurality of cells which are affixed to each other and have sides which extend in the radial direction of the sphere, the radial ends of the cells being open and the sides being formed with holes therethrough.

3. A damper as in claim 1, wherein:
    said braking means comprises a plurality of braking pads set in place in the circular section of the tank wall, the braking surfaces of the pads being coextensive with the inner surface of the tank wall,
    one of the braking pads being controllable for movement radially inward so that pressure contact can be made by its braking surface with the outer surface of the sphere.

4. A damper as in claim 2, wherein:
    said cells are hexagonal in shape, the bases of the hexagon being open.

5. A damper as in claim 4, wherein:
    said braking means comprises a plurality of braking pads set in place in the circular section of the tank wall, the braking surfaces of the pads being coextensive with the inner surface of the tank wall,
    one of the braking pads being controllable for movement radially inward so that pressure contact can be made by its braking surface with the outer surface of the sphere.

* * * * *